US008452107B2

(12) United States Patent
Zheng et al.

(10) Patent No.: US 8,452,107 B2
(45) Date of Patent: May 28, 2013

(54) METHODS AND SYSTEMS FOR OCCLUSION TOLERANT FACE RECOGNITION

(75) Inventors: Thomas Zheng, San Diego, CA (US); Yinyin Liu, San Diego, CA (US); Paul E. Bender, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 12/573,051

(22) Filed: Oct. 2, 2009

(65) Prior Publication Data

US 2011/0081053 A1    Apr. 7, 2011

(51) Int. Cl.
*G06K 9/48* (2006.01)
*G06K 9/40* (2006.01)

(52) U.S. Cl.
USPC .......................................... 382/197; 382/260

(58) Field of Classification Search
None
See application file for complete search history.

(56) References Cited

U.S. PATENT DOCUMENTS

| 6,993,193 | B2 * | 1/2006 | Smith | 382/224 |
|---|---|---|---|---|
| 2004/0086157 | A1 * | 5/2004 | Sukegawa | 382/115 |
| 2007/0156471 | A1 * | 7/2007 | Moghaddam et al. | 705/7 |
| 2008/0077530 | A1 * | 3/2008 | Banas et al. | 705/50 |
| 2008/0144941 | A1 * | 6/2008 | Togashi | 382/207 |

OTHER PUBLICATIONS

Wright, Robust Face Recognition via Sparse Representation, 2007, IEEE Trans. Pami, pp. 1-30.*

Maximilian Riesenhuber and Tomaso Poggio, "Hierarchical models of object recognition in cortex", Journal of Nature Neuroscience, vol. 2, No. 11, pp. 1019-1025, Nov. 1999.
John Wright, Yi Ma, Julien Mairal, Guillermo Sapiro, Thomas Huang, and Shuicheng Yan, "Sparse representation for computer vision and pattern recognition", in Proceedings of IEEE International. Conference on Computer Vision and Pattern Recognition, Mar. 2009.
Wright, Allen Y. Yang, Arvind Ganesh, Shankar Sastry and Yi Ma, "Robust face recognition via sparse representation", IEEE Transactions on Pattern Analysis and Machine Intelligence, vol. 31, No. 2, pp. 210-227.
Allen Y. Yang, John Wright, Yi Ma and Shankar Sastry, "Unsupervised segmentation of natural images via lossy data compression", Journal of Computer Vision and Image Understanding, vol. 110, issue 2, pp. 212-225, May 2008.
Duc-Son Pham, et al., "Joint learning and dictionary construction for pattern recognition", Computer Vision and Pattern Recognition, 2008, CVPR 2008, IEEE Conference on, IEEE, Piscataway, NJ, USA, Jun. 23, 2008, pp. 1-8, XP031296966.
Mairal J, at al., "Discriminative learned dictionaries for local image analysis", Computer Vision and Pattern Recognition, 2008, CVPR 2008, IEEE Conference on, IEEE, Piscataway, NJ, USA, Jun. 23, 2008, pages 1-8, XP031297210.
Maral J, et al., "Online Dictionary Learning for Sparse Coding", 26TH International Conference on Machine Learning (ICML 2009), Jun. 14, 2009-Jun. 17, 2009, pp. 1-8, XP002621247.
Yang A Y, et al., "Feature selection in face recognition, a sparse representation perspective", UC Berkeley Technical Report UCB/EECS-2007-99, [Online] Aug. 14, 2007, pp. 1-20, XP002591886, Retrieved from the Internet, URL: http,/www.eecs.berkeley.edu/Pubs/Tech Rpts/2007/EECS-2007-99.html.

* cited by examiner

*Primary Examiner* — Bhavesh Mehta
*Assistant Examiner* — David F Dunphy
(74) *Attorney, Agent, or Firm* — Rupit M. Patel

(57) ABSTRACT

Certain embodiments of the present disclosure relate to a method for face recognition that is occlusion tolerant and scale/shift invariant based on a combination of hierarchical maximization and adaptive representation technique.

40 Claims, 11 Drawing Sheets

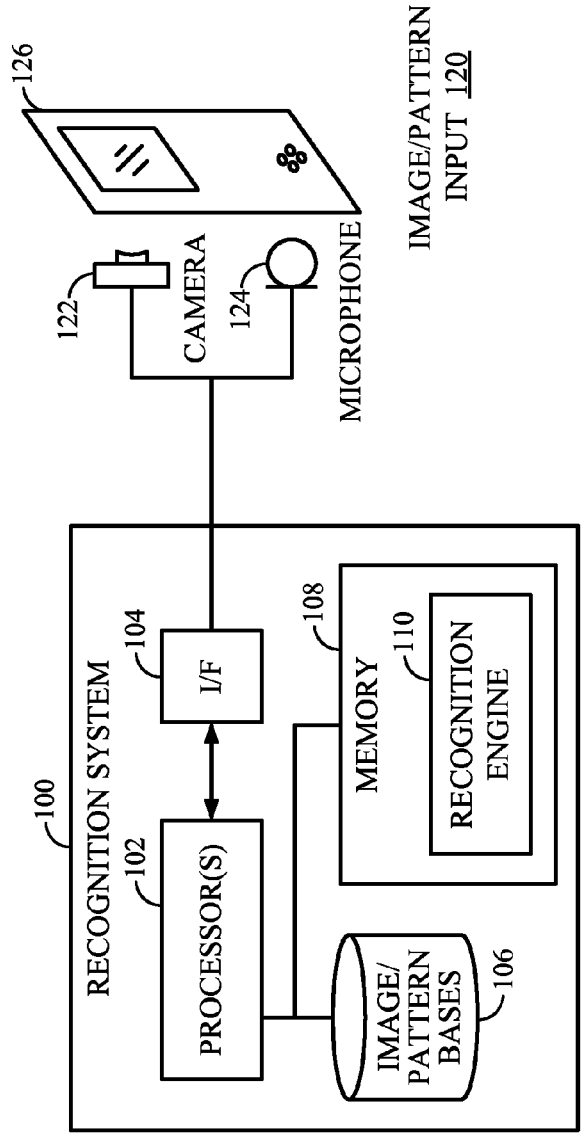
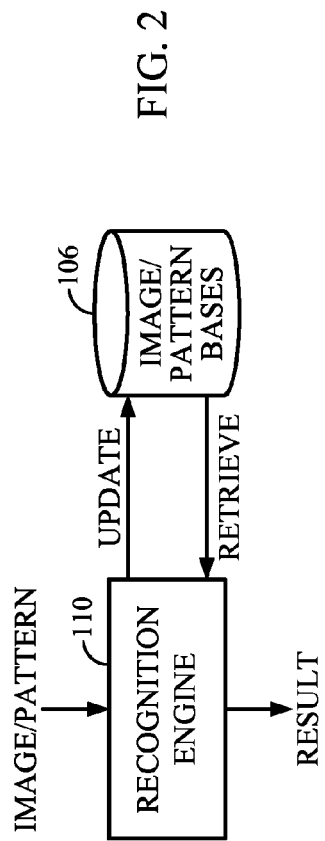
FIG. 1
FIG. 2

METHODS AND SYSTEMS FOR OCCLUSION TOLERANT FACE RECOGNITION

TECHNICAL FIELD

The present disclosure generally relates to signal processing and, more particularly, to a method for reconstructing a signal based on an adaptive algorithm.

BACKGROUND

In performing face recognition for a set of subjects, certain issues need to be resolved, such as: spatial variability, scale variability, contrast variability, pose variability, occlusions, and the like. In many applications, especially in mobile applications, an online learning scheme is also desirable so that a recognition system can incorporate a growing set of subjects, learn new faces on the fly and dynamically adjust the candidate subject set according to context information.

Occlusion especially represents a significant obstacle to a robust face recognition process. This is mainly due to the unpredictable error caused by the occlusion. The occlusion can affect any part of a face image, and can be arbitrarily large in magnitude. On the other hand, the error caused by the occlusion typically corrupts only a portion of the image. Because of that, the error can have the sparse representation, which might be useful for low complexity reconstruction process.

SUMMARY

Certain embodiments of the present disclosure provide a method for signal processing. The method generally includes filtering a signal related to a subject of a plurality of subjects, adaptively generating a signal subspace according to the subject, finding a sparse solution associated with the filtered signal by using the signal subspace, performing identification of the subject based on the sparse solution and the signal subspace, if sparsity of the sparse solution is greater than a defined threshold value, and updating statistics of bases of the filtered signal in a set of bases, if identity of the subject is confirmed.

Certain embodiments of the present disclosure provide an apparatus for signal processing. The apparatus generally includes an interface for generating a signal related to a subject of a plurality of subjects and a recognition engine configured to filter the signal, adaptively generate a signal subspace according to the subject, find a sparse solution associated with the filtered signal by using the signal subspace, perform identification of the subject based on the sparse solution and the signal subspace if sparsity of the sparse solution is greater than a defined threshold value, and update statistics of bases of the filtered signal in the set of bases, if identity of the subject is confirmed.

Certain embodiments of the present disclosure provide an apparatus for signal processing. The apparatus generally includes a means for filtering a signal related to a subject of a plurality of subjects, a means for adaptively generating a signal subspace according to the subject, a means for finding a sparse solution associated with the filtered signal by using the signal subspace, a means for performing identification of the subject based on the sparse solution and the signal subspace, if sparsity of the sparse solution is greater than a defined threshold value, and a means for updating statistics of bases of the filtered signal in a set of bases, if identity of the subject is confirmed.

Certain embodiments of the present disclosure provide a computer-program product for signal processing. The computer-program product generally includes a computer-readable medium having instructions stored thereon, the instructions being executable by one or more processors. The instructions generally include instructions for filtering a signal related to a subject of a plurality of subjects, instructions for adaptively generating a signal subspace according to the subject, instructions for finding a sparse solution associated with the filtered signal by using the signal subspace, instructions for performing identification of the subject based on the sparse solution and the signal subspace, if sparsity of the sparse solution is greater than a defined threshold value, and instructions for updating statistics of bases of the filtered signal in a set of bases, if identity of the subject is confirmed.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 1 illustrates a system for pattern recognition in which certain embodiments of the present disclosure may be practiced.

FIG. 2 illustrates an example of a pattern recognition engine interfaced with pattern bases in accordance with certain embodiments of the present disclosure.

DETAILED DESCRIPTION

Figure 3:
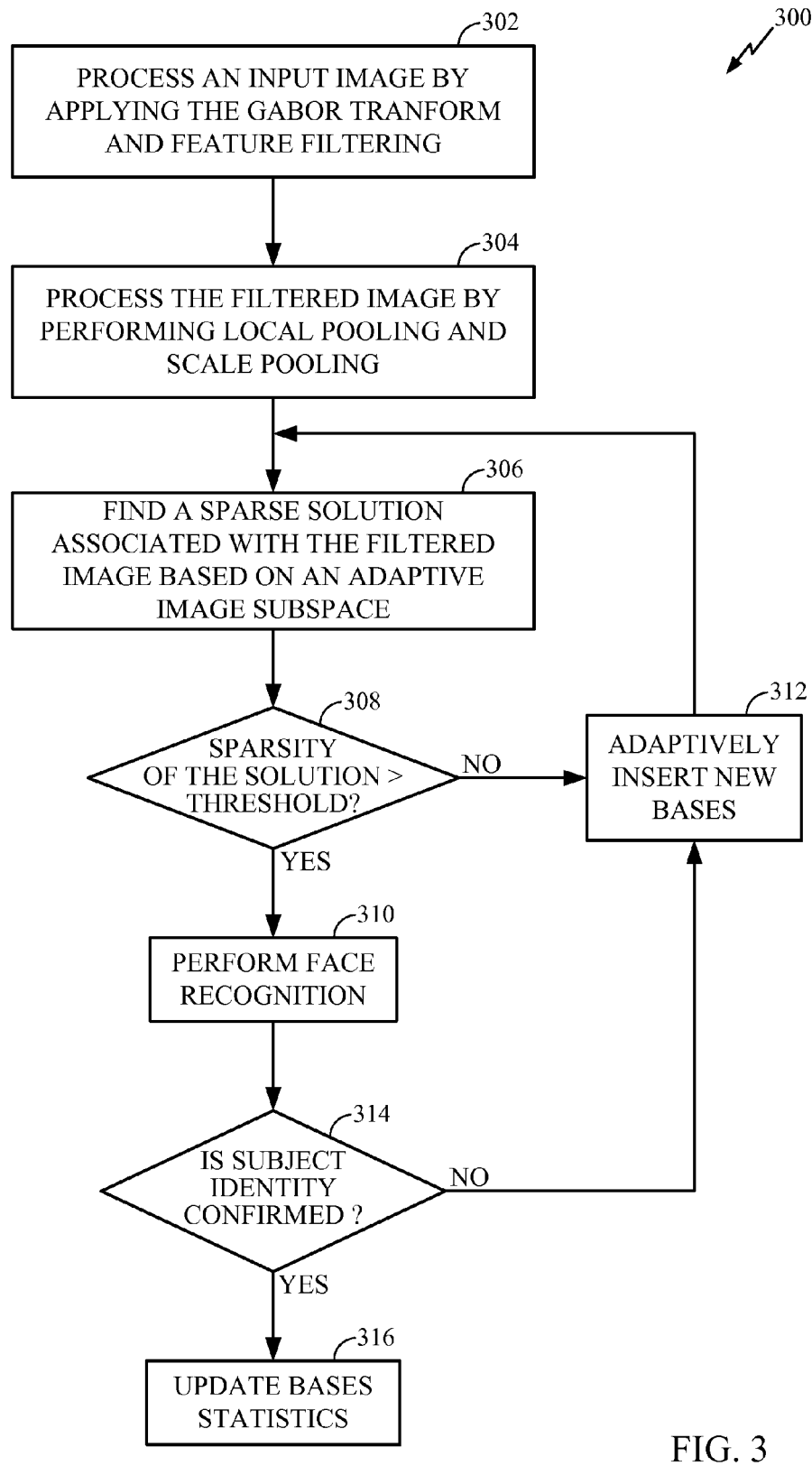
FIG. 3 illustrates example operations for adaptive sparse subspace face recognition from an input image in accordance with certain embodiments of the present disclosure.

Various embodiments of the disclosure are described below. It should be apparent that the teachings herein may be embodied in a wide variety of forms and that any specific structure, function, or both, being disclosed herein is merely representative. Based on the teachings herein, one skilled in the art should appreciate that an embodiment disclosed herein may be implemented independently of any other embodiments and that two or more of these embodiments may be combined in various ways. For example, an apparatus may be implemented or a method may be practiced using any number of the embodiments set forth herein. In addition, such an apparatus may be implemented or such a method may be practiced using other structure, functionality, or structure and functionality in addition to or other than one or more of the embodiments set forth herein. Furthermore, an embodiment may comprise at least one element of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses, or objectives. Rather, embodiments of the disclosure are intended to be broadly applicable to different wireless technologies, system configurations, networks, and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

Exemplary Pattern Recognition

The techniques described herein relate to signal processing, and, more particularly, to processing of a pattern signal which is related to a subject that needs to be identified.

FIG. 1 illustrates an example system 100 for pattern recognition in which embodiments of the present disclosure may be practiced. The pattern recognition system 100 may be used to recognize different patterns or signals, such as images for face recognition or audio signals for voice recognition.

The system 100 may be utilized in a wide range of applications, including security application (e.g., in airports and office buildings), and may be implemented on a wide range of different type platforms, such as a desktop, a laptop computer, or a handheld device (e.g., a mobile phone).

According to certain embodiments of the present disclosure, an input platform 120 may include a screening station 126, through which a camera 122 may provide signals corresponding to an image of a person's face and/or a microphone 124 may provide signals corresponding to the person's voice. The screening station 126, for example, may be positioned at a security checkpoint, such as those found in airports or building entrances. While the platform 120 is shown with both a camera 122 and microphone 124, according to certain aspects only one of such devices may be included. Further, additional or alternative devices may also be used, such as a fingerprint reader, iris reader, or the like. Whatever devices or combination of devices are used, the pattern recognition system 100 may be configured to identify a pattern based on the signals received.

The pattern recognition system 100 may include an interface 104 to receive and process the input signals. The interface 104 may include any suitable circuitry, such as amplifiers, filters, analog-to-digital (A/D) converters and the like, to provide a suitable pattern signal for one or more processors 102. The processor(s) 102 may process the input pattern signal according to some recognition algorithm initiated for execution by a recognition engine 110 within the memory 108. As will be described in greater detail below, the pattern recognition (i.e., subject identification) may be achieved, for example, by matching the input pattern signal (e.g., the face image or voice) with available pattern bases 106 associated with a plurality of subjects.

As illustrated in FIG. 2, the recognition engine 110 may interface with the pattern bases 106. For example, the recognition engine 110 may generate and update the pattern bases 106 during training operations. The pattern bases may be accessed to perform recognition operations. In other words, an input pattern (e.g., a face image or voice) may be processed for subject recognition according to the recognition algorithm run by the recognition engine 110 by using one or more pattern bases retrieved from the pool of pattern bases 106. Furthermore, pattern bases related to the existing subjects may be periodically updated during the training process, and one or more pattern bases associated with one or more new subjects may be also added in the pool of pattern bases 106.

Exemplary Adaptive Sparse Subspace Face Recognition

Certain embodiments of the present disclosure support an adaptive representation technique for various recognitions applications. While the techniques herein may be applied to a wide variety of problems, the present disclosure will describe face recognition as a particular, but not limiting, example of how the techniques presented herein may be applied.

The example application presented herein may be viewed as face recognition by reconstruction. According to certain aspects, the Hierarchical Maximization (HMAX) model may be utilized to build a shift/scale invariant front-end filtered image. The HMAX technique for recognition of visual objects, incorporated herein by reference for informational purposes, is described in Maximilian Riesenhuber and Tomaso Poggio, "Hierarchical models of object recognition in cortex", Journal of Nature Neuroscience, vol. 2, no. 11, pp. 1019-1025, November 1999.

Certain aspects of the present disclosure may be applied in what might be considered the second layer of image processing. A suitable sampling technique is provided for collecting patches of the filtered image as the bases for subspaces, while the face image may be reconstructed according to a Least Absolute Deviation method. The identity of the subject may be determined according to the accuracy of reconstruction by using patches from different subjects.

The proposed face recognition approach may allow building a robust face recognition system against occlusion. It may also facilitate incorporating of new subjects by adding patches from new input images. Therefore, the proposed system may be considered as an online face recognition system. In addition, the proposed adaptive reconstruction scheme may be utilized to identify salient patches in a person's face.

FIG. 3 illustrates example operations 300 for adaptive sparse subspace face recognition from an input image in accordance with certain embodiments of the present disclosure. The input image may correspond to the input pattern signal from FIG. 1, while the operations 300 may be executed on the system 100. At 302, the input image may be processed by applying the Gabor transform and feature filtering. At 304, the filtered image may be additionally processed by performing a local pooling and scale pooling. Following this, a sparse solution associated with the input filtered image may be found, at 306, using an adaptive image subspace. The sparse solution may comprise information about patches in the subspaces related to the filtered image, such as information about what patches may be actively used to reconstruct the image.

If the level of sparsity of the found solution is above a defined threshold value (decision block 308), then a face recognition process (i.e., subject identification) may be performed, at 310. The threshold value may be obtained empirically. On the other hand, if the level of sparsity of the sparse solution is not satisfactory (i.e., below the defined threshold value), then new bases may be adaptively inserted, at 312, into a set of bases for each subject by utilizing one or more training images associated with the subject. The added new bases may be then used, at 306, for finding another sparse solution.

If the subject identity is confirmed after the recognition process (decision block 314), bases statistics may be then updated, at 316. Otherwise, at 312, new bases may be adaptively inserted into the set of bases for the subject that current input image is associated with. After that, the sparse solution may be searched, at 306, for the next input image using the adaptive image subspace and the updated set of bases.

Figure 4:
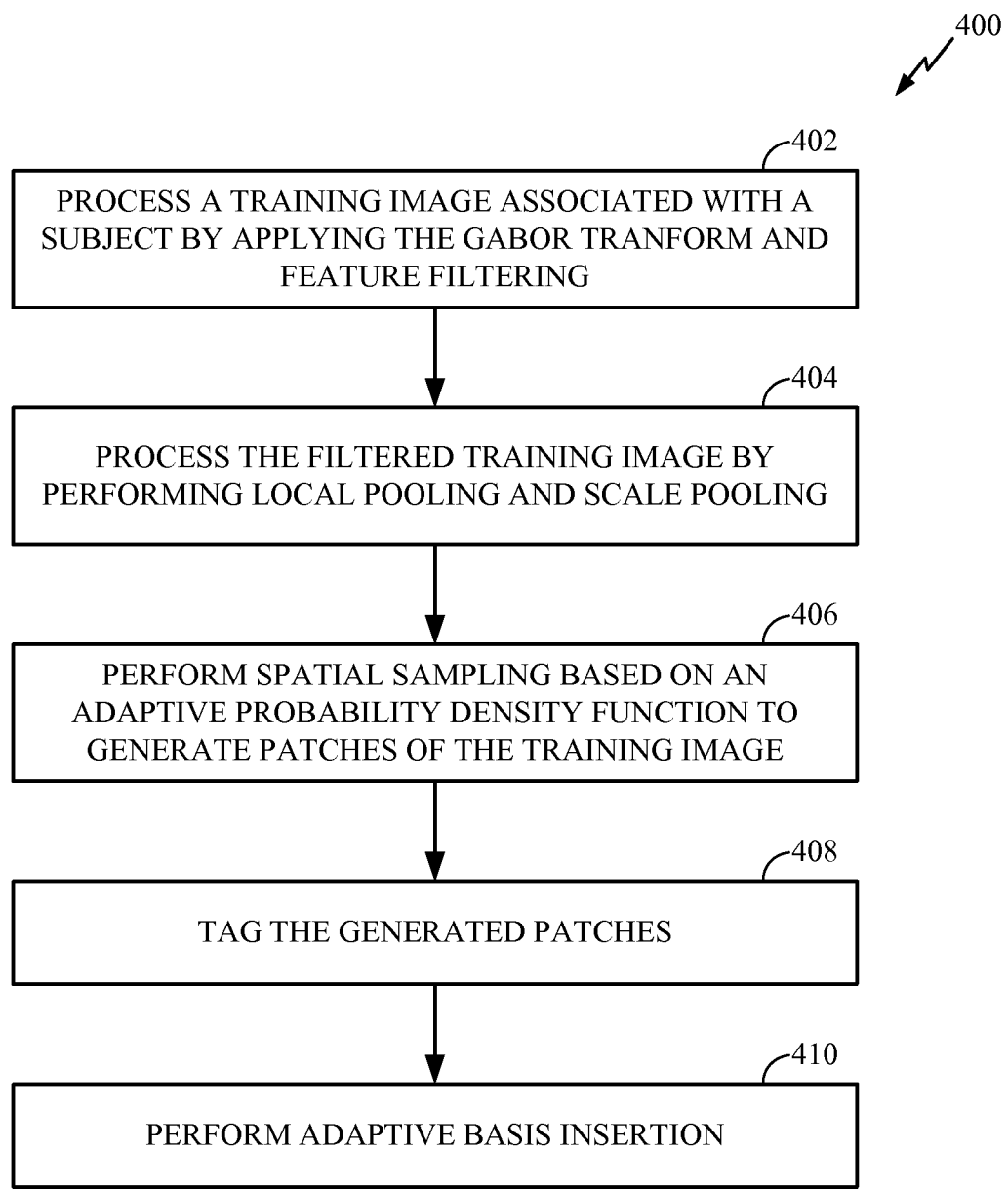
FIG. 4 illustrates example operations for adding new bases into a set of bases for a certain subject in accordance with certain embodiments of the present disclosure.

FIG. 4 illustrates example operations 400 for adding new bases into the set of bases for each subject in accordance with certain embodiments of the present disclosure. The processing step 312 from FIG. 3 may comprise operations 400. A training image associated with an arbitrary subject k may be processed, at 402, by employing the Gabor transform and by applying the feature filtering. At 404, the filtered image may be additionally processed by performing local pooling and scale pooling. Following this, at 406, spatial sampling based on an adaptive probability density function (PDF) may be performed to generate multiple patches of the input training image. At 408, the generated patches may be tagged (i.e., patch location and size may be indicated, the current image size may be labeled, the time when the patches are generated may be labeled, and subject identification and image index may be added to each patch). An initial cumulative score (i.e., a rank) may be assigned to each tagged patch. The cumulative score represents a metric related to the effectiveness of the patch for the subject identification. At 410, the tagged patches may be adaptively inserted in the set of bases for the subject k.

Figure 5:
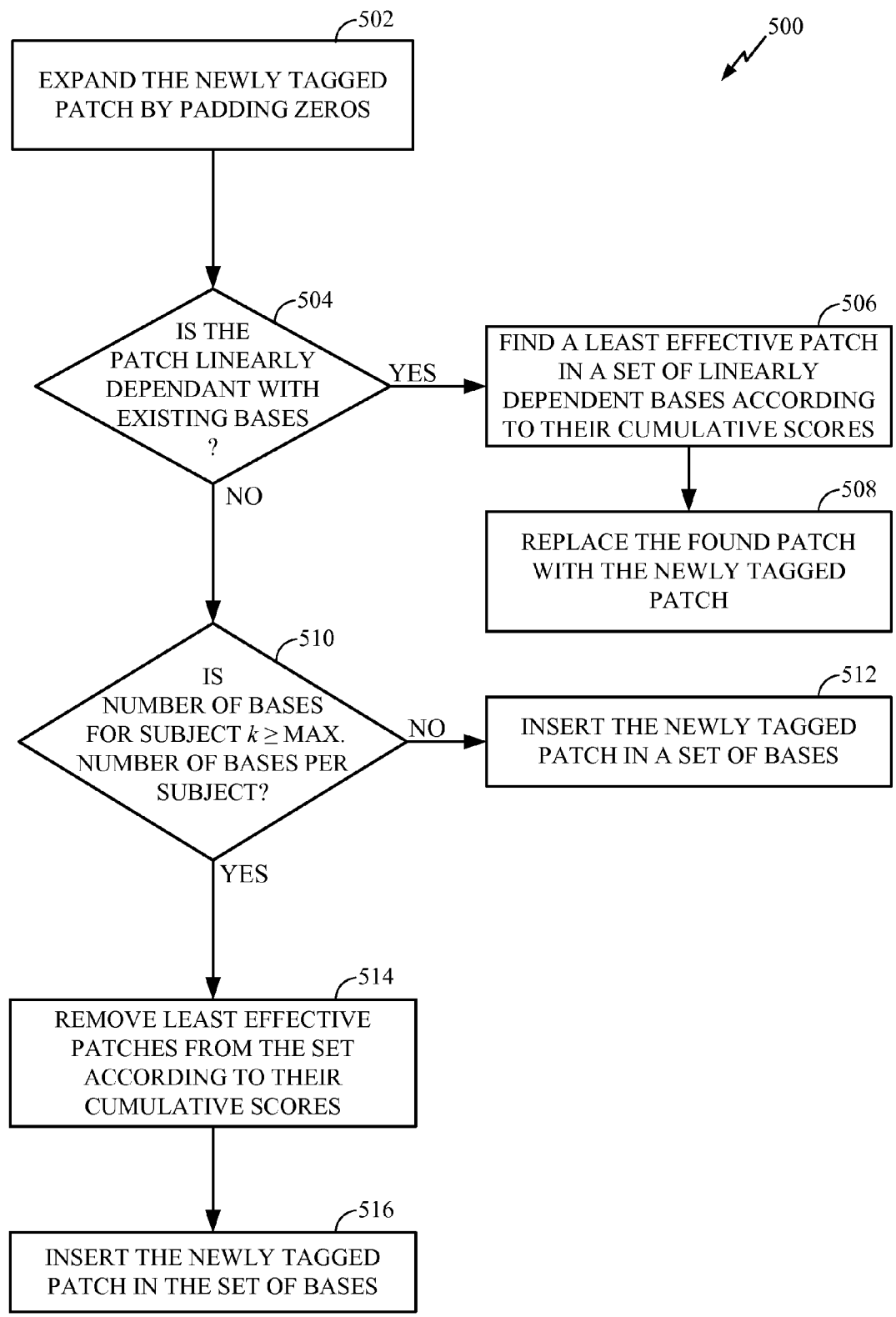
FIG. 5 illustrates example operations for adaptive insertion of new bases into the set of bases for the subject in accordance with certain embodiments of the present disclosure.

FIG. 5 illustrates example operations 500 for adaptive insertion of new bases into the set of bases for each subject in accordance with certain embodiments of the present disclosure. The processing step 410 from FIG. 4 may comprise operations 500. At 502, the generated new tagged patch associated with the subject k may be expanded to an appropriate size by performing zero padding (i.e., adding pixels with zero intensity). If the new patch is linearly dependant with at least one existing patch from the set (decision block 504), then, at 506, a least effective patch for the subject identification may be found in a portion of the set with linearly dependent bases according to their cumulative scores. This found patch may be then replaced, at 508, with the newly tagged patch. It should be noted that less effective patch for the subject identification may be associated with a smaller cumulative score, and vice-versa.

If the new tagged patch is not linearly dependant with the existing patches from the set of bases (decision block 504) and if a number of bases for the subject k is not equal to or greater than a defined maximum number of bases per subject (decision block 510), then the new tagged patch may be directly inserted in the set, at 512. On the other hand, if the number of bases for the subject k is equal to or exceeds the defined maximum number of bases per subject (decision block 510), then, at 514, least effective patches for the subject identification according their cumulative scores may be removed from the set. At 516, the new tagged patch may be inserted in the set. It should be noted that operations 400 and 500 illustrated in FIGS. 4-5 may be performed for every analyzed subject k, k=1, ..., K.

Figure 6:
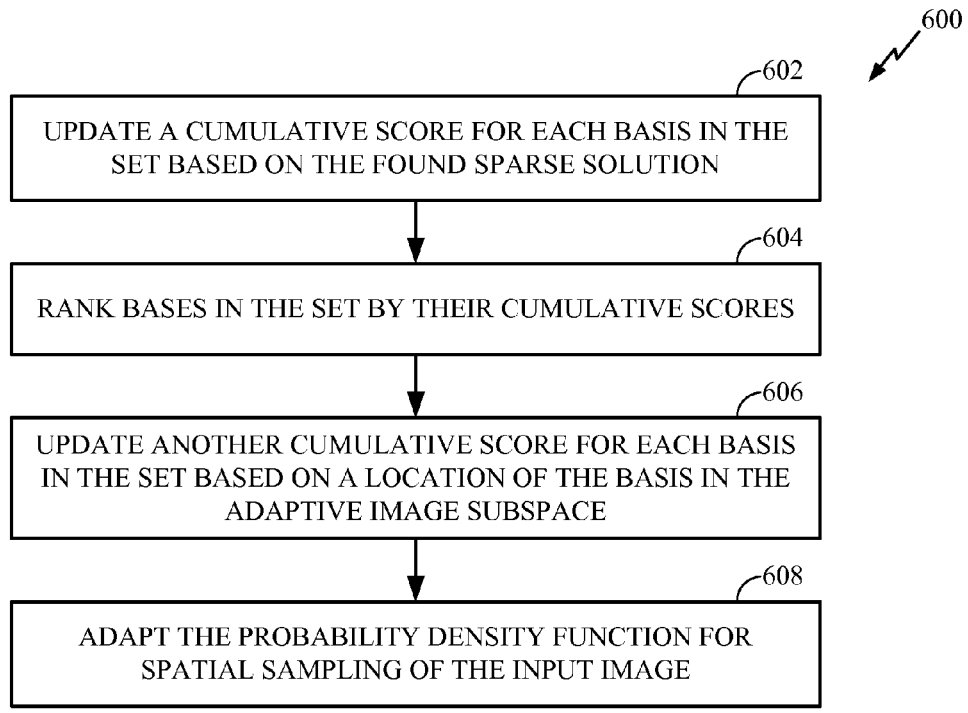
FIG. 6 illustrates example operations for updating statistics of the set of bases in accordance with certain embodiments of the present disclosure.

FIG. 6 illustrates example operations 600 for updating statistics of the set of bases in accordance with certain embodiments of the present disclosure. The processing step 316 from FIG. 3 may comprise operations 600. The sparse solution associated with the input image obtained at the processing step 306 from FIG. 3 may be utilized, at 602, to update a cumulative score for each basis in the set of bases. At 604, the bases may be ranked in the set by its cumulative score. A particular patch may be more effective for face recognition (i.e., subject identification) if its cumulative score is higher, and vice-versa. In the same time, the found sparse solution associated with the input image may be also utilized, at 606, to update another cumulative score of each location associated with an identified patch in the input image. At 608, the spatial sampling PDF utilized for generating sampled patches of the input image may be updated according to the other cumulative score of each patch.

Figure 7:
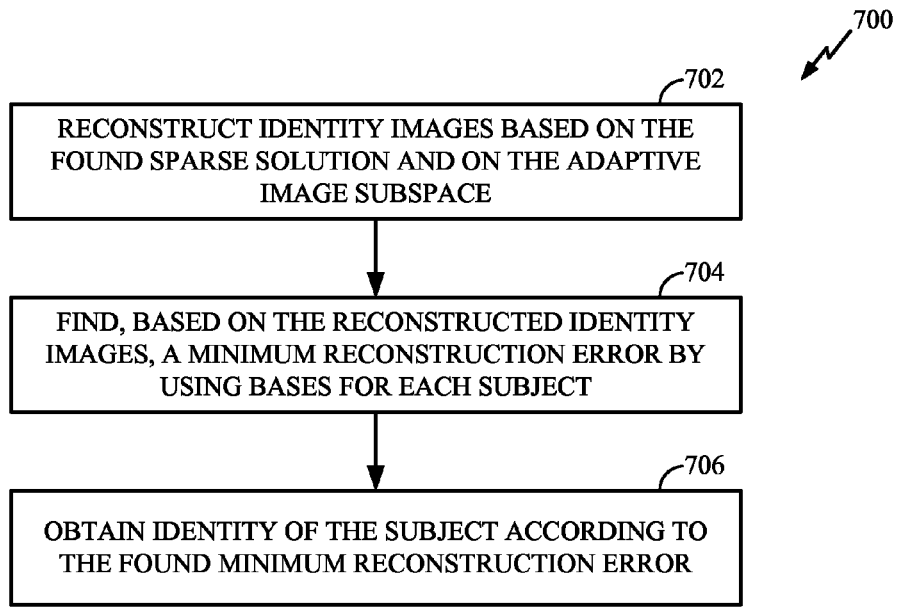
FIG. 7 illustrates example operations for recognizing identity of the subject in accordance with certain embodiments of the present disclosure.

FIG. 7 illustrates example operations 700 for recognizing identity of the subject in accordance with certain embodiments of the present disclosure. The processing step 310 from FIG. 3 may comprise operations 700. The adaptive image subspace and the sparse solution obtained according to the processing step 306 from FIG. 3 may be utilized, at 702, to reconstruct identity images. At 704, a minimum reconstruction error may be found by employing bases for each subject. At 706, the identity of the subject may be obtained according to the found minimum reconstruction error.

Figure 8:
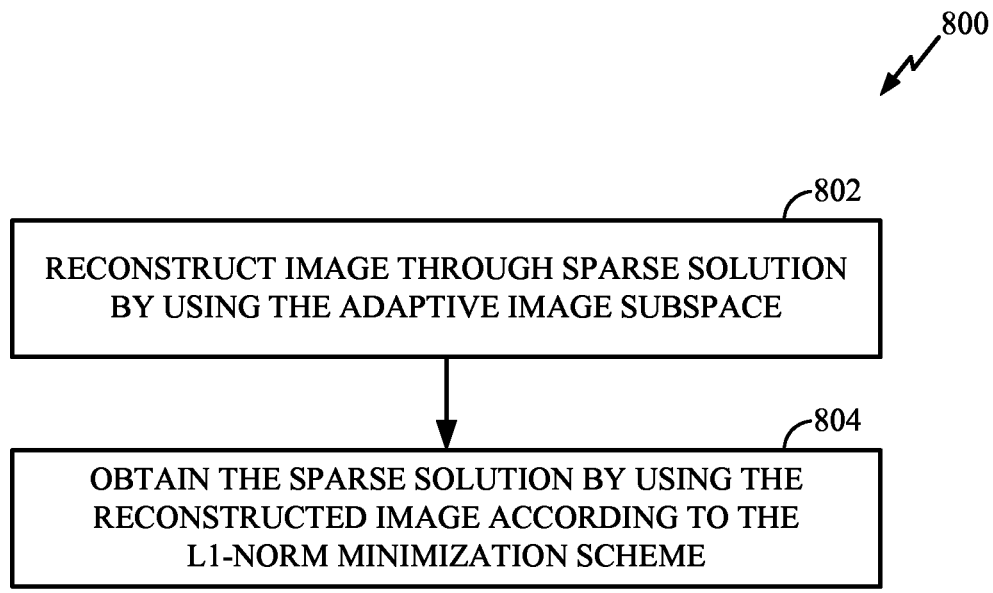
FIG. 8 illustrates example operations for finding a sparse solution of the input image using the adaptive image subspace in accordance with certain embodiments of the present disclosure.

FIG. 8 illustrates example operations 800 for finding a sparse solution of the input image using the adaptive image subspace in accordance with certain embodiments of the present disclosure. The processing step 306 from FIG. 3 may comprise operations 800. At 802, the processed input image from the previous processing layer (e.g., the HMAX layer) along with a truncated image subspace may be utilized for image reconstruction. At 804, the sparse solution associated with the reconstructed image may be obtained according to the $l_1$-norm minimization scheme.

Figure 9:
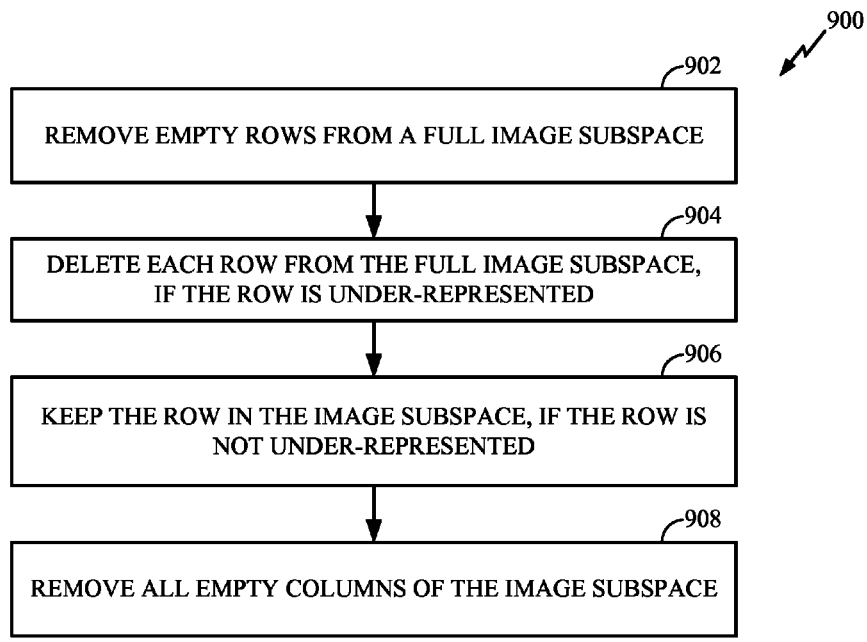
FIG. 9 illustrates example operations for truncation of the image subspace in accordance with certain embodiments of the present disclosure.

FIG. 9 illustrates example operations 900 for the truncation of the image subspace, which may be utilized for operations 802-804 from FIG. 8 in accordance with certain embodiments of the present disclosure. At 902, empty rows of pixels may be removed from a full image subspace. If a row within the full image subspace is under-represented, then said row may be deleted from the full image subspace, at 904. On the other hand, if the row is not under-represented, then the row may be kept in the image subspace, at 906. Also, all empty columns of pixels may be removed from the image subspace, at 908.

Figure 3A:
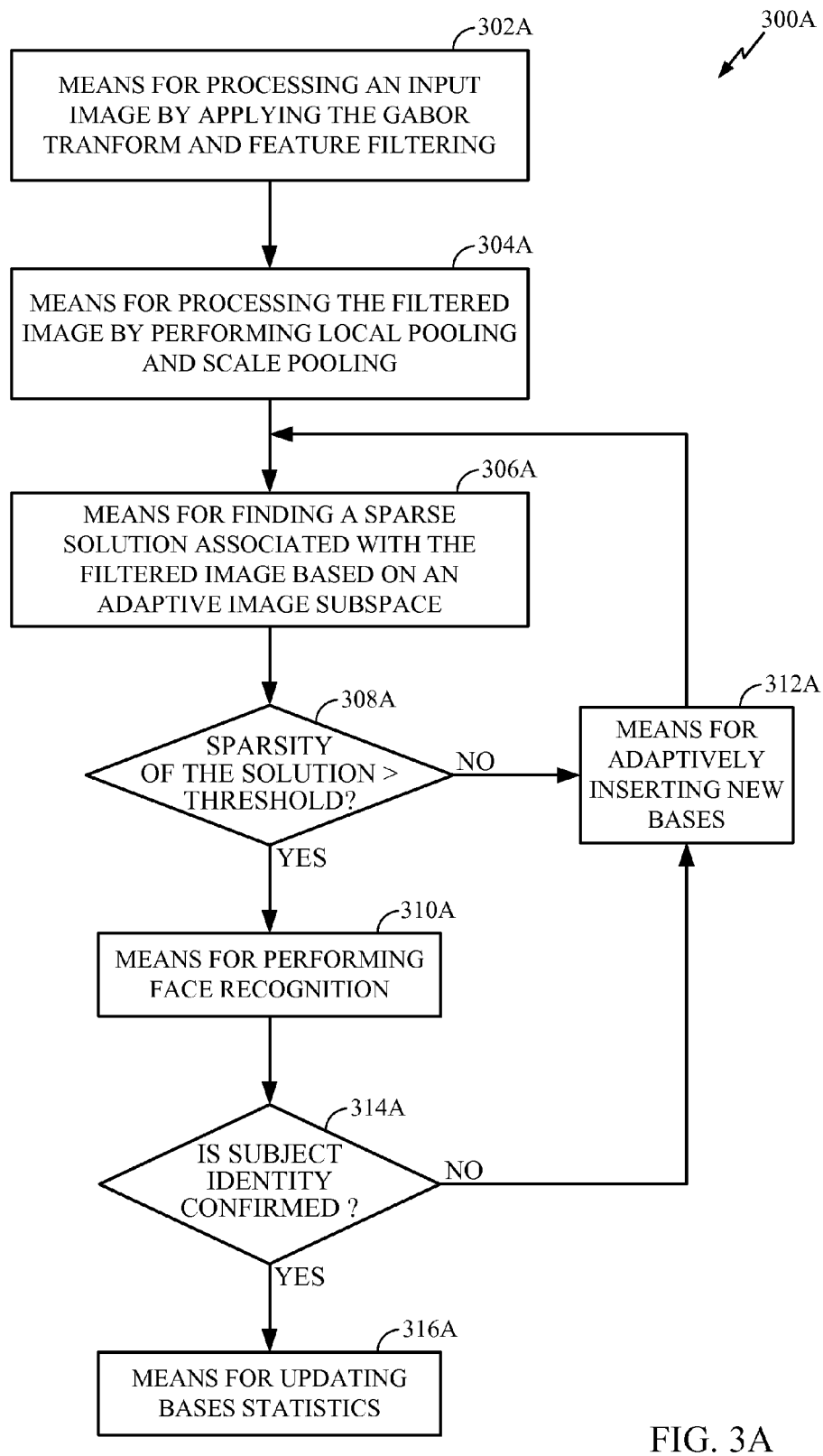
FIG. 3A illustrates example components capable of performing the operations shown in FIG. 3.
Figure 4A:
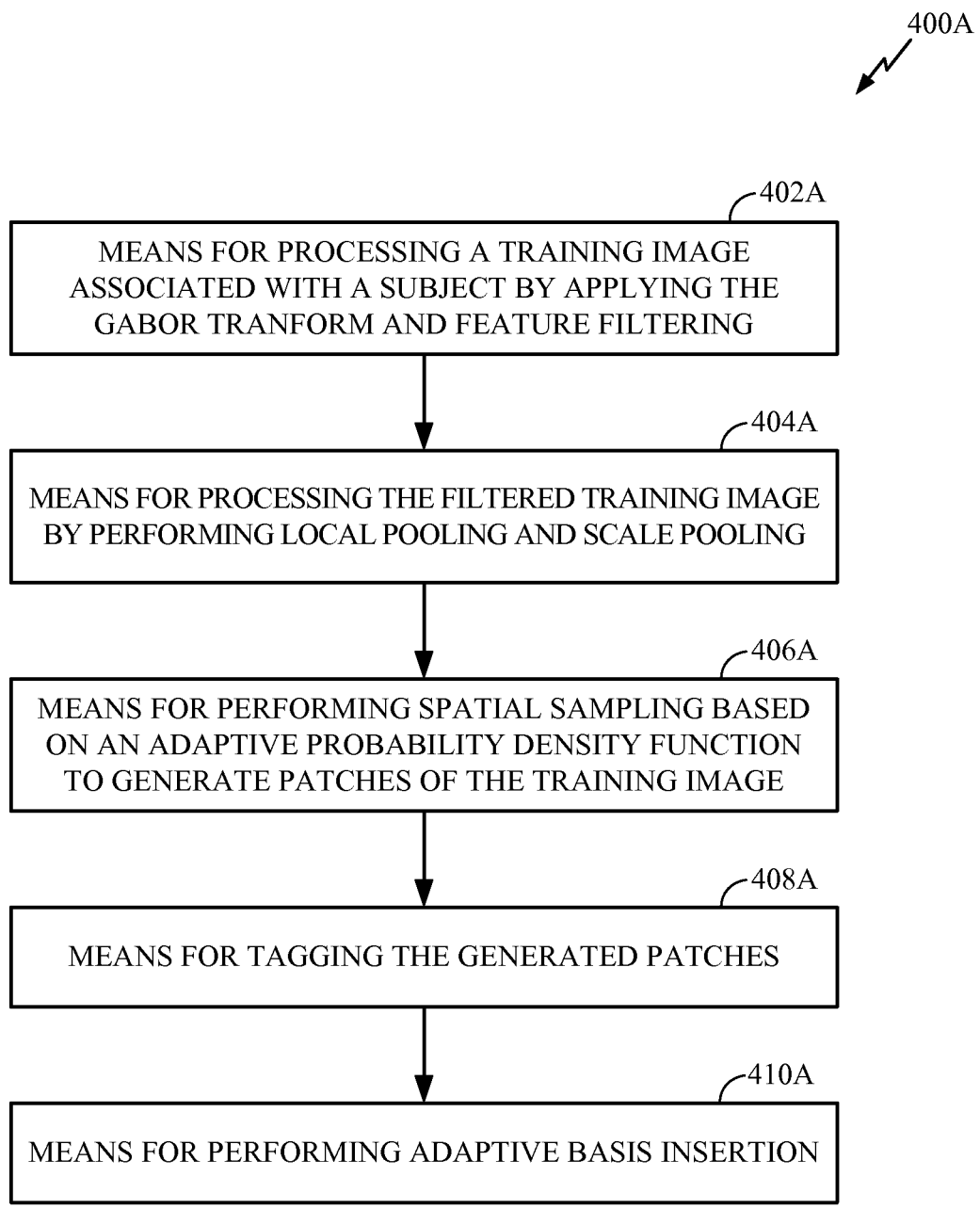
FIG. 4A illustrates example components capable of performing the operations shown in FIG. 4.
Figure 5A:
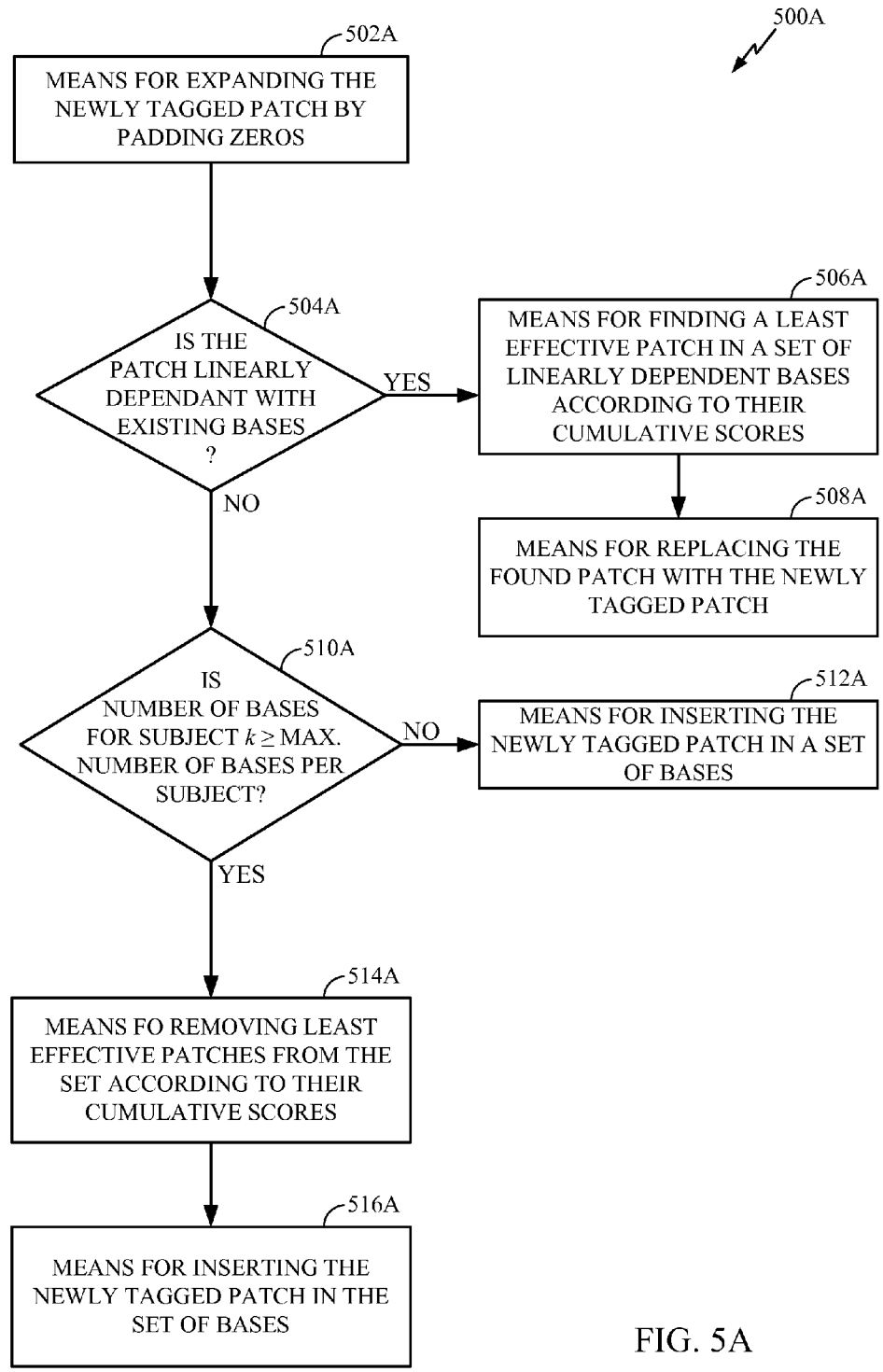
FIG. 5A illustrates example components capable of performing the operations shown in FIG. 5.
Figure 6A:
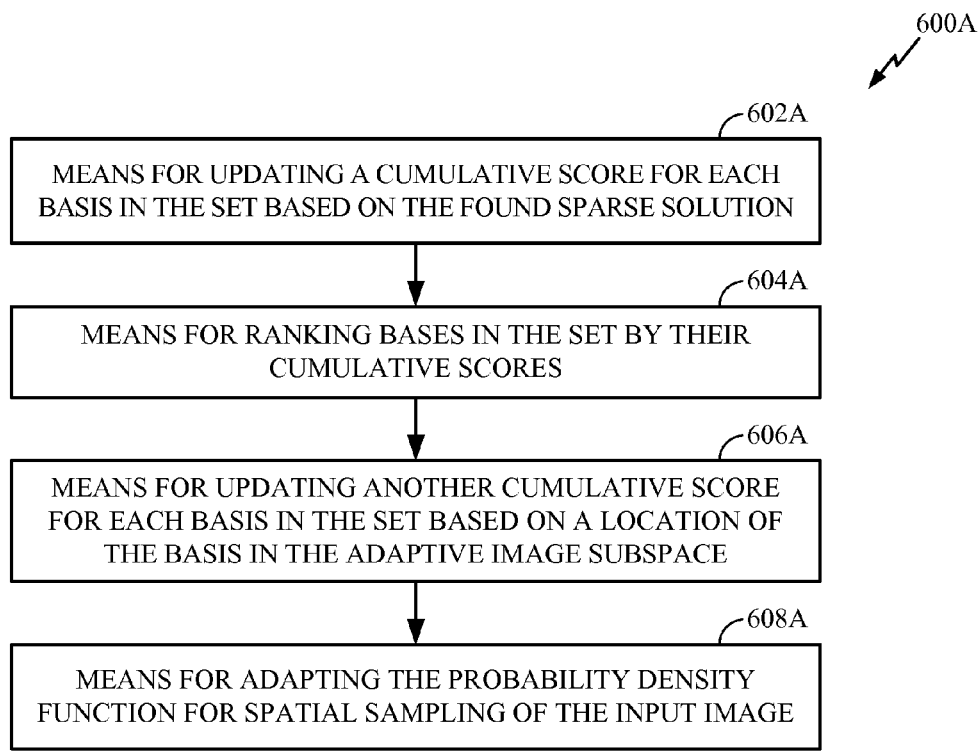
FIG. 6A illustrates example components capable of performing the operations shown in FIG. 6.
Figure 7A:
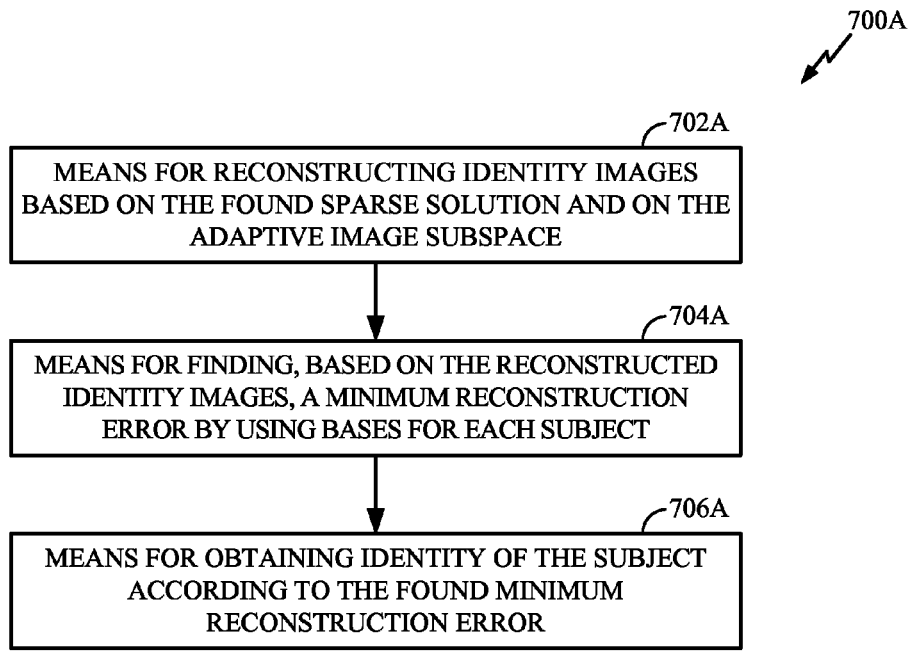
FIG. 7A illustrates example components capable of performing the operations shown in FIG. 7.
Figure 8A:
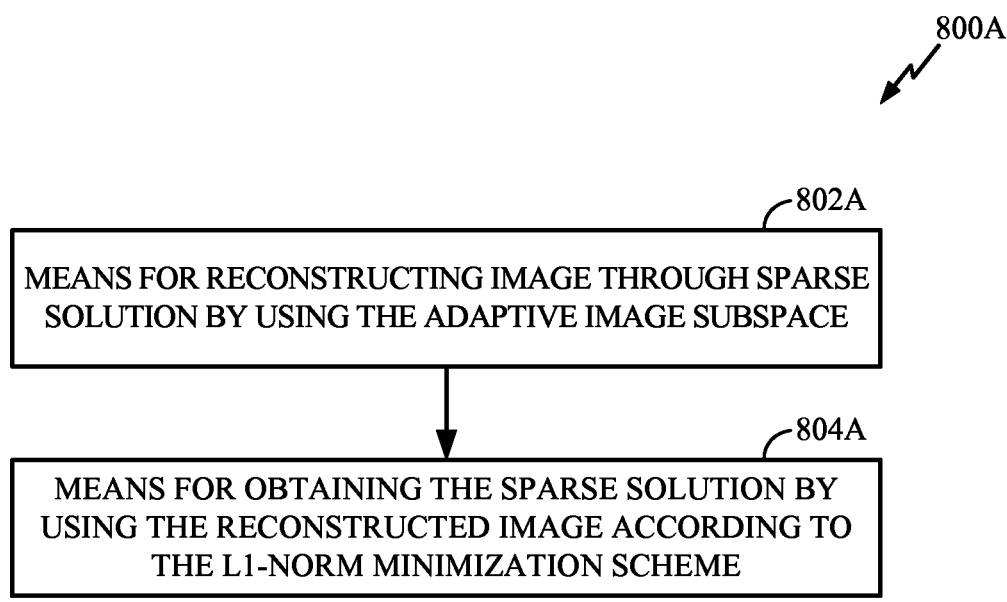
FIG. 8A illustrates example components capable of performing the operations shown in FIG. 8.
Figure 9A:
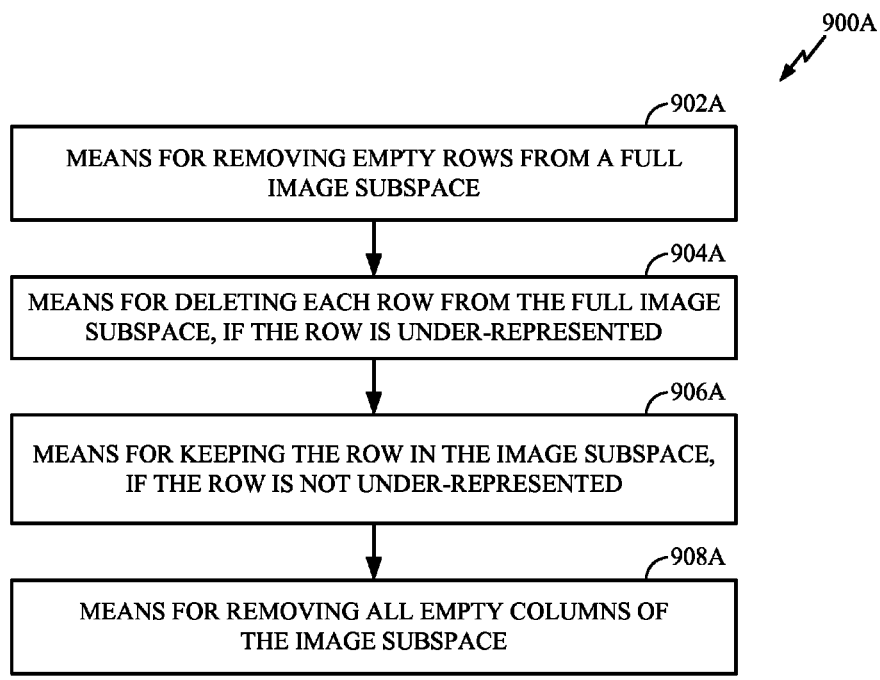
FIG. 9A illustrates example components capable of performing the operations shown in FIG. 9.

The various operations of methods described above may be performed by various hardware and/or software component(s) and/or module(s) corresponding to means-plus-function blocks illustrated in the Figures. For example, blocks 302-316 illustrated in FIG. 3 correspond to means-plus-function blocks 302A-316A illustrated in FIG. 3A. Similarly, blocks 402-410 illustrated in FIG. 4 correspond to means-plus-function blocks 402A-410A illustrated in FIG. 4A. Similarly, blocks 502-516 illustrated in FIG. 5 correspond to means-plus-function blocks 502A-516A illustrated in FIG. 5A. Similarly, blocks 602-608 illustrated in FIG. 6 correspond to means-plus-function blocks 602A-608A illustrated in FIG. 6A. Similarly, blocks 702-706 illustrated in FIG. 7 correspond to means-plus-function blocks 702A-706A illustrated in FIG. 7A. Similarly, blocks 802-804 illustrated in FIG. 8 correspond to means-plus-function blocks 802A-804A illustrated in FIG. 8A. Similarly, blocks 902-908 illustrated in FIG. 9 correspond to means-plus-function blocks 902A-908A illustrated in FIG. 9A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for signal processing, comprising:
   filtering a signal related to a subject of a plurality of subjects;
   adaptively generating a signal subspace according to the subject;
   finding a sparse solution associated with the filtered signal by using the signal subspace;
   performing identification of the subject based on the sparse solution and the signal subspace, if sparsity of the sparse solution is greater than a defined threshold value;
   updating statistics of bases of the filtered signal in a set of bases, if identity of the subject is confirmed; and
   adaptively inserting one or more new bases into the set of bases until the identity of the subject is confirmed, if the sparsity of the sparse solution is greater than the defined threshold value.

2. The method of claim 1, further comprising:
   finding another sparse solution associated with another filtered signal, if the sparsity of the sparse solution is greater than the defined threshold value and if identity of the subject is not confirmed.

3. The method of claim 1, further comprising:
   adaptively inserting one or more new bases into the set of bases and finding another sparse solution associated with the filtered signal, if the sparsity of the sparse solution is not greater than the defined threshold value.

4. The method of claim 3, wherein adaptively inserting the one or more new bases comprises:
   performing spatial sampling of a training signal associated with the subject according to an adaptive probability density function (PDF) to generate one or more patches of the training signal;

tagging the generated patches;
expanding each of the tagged patches; and
inserting each of the tagged patches into the set, if the tagged patch is not linearly dependent with patches from the set and if a number of the patches in the set is smaller than a defined maximum number of patches.

5. The method of claim 4, further comprising:
finding, in a portion of the set with linearly dependent bases according to their cumulative scores, a least effective patch for the subject identification, if the tagged patch is linearly dependent with the patches in the set; and
replacing, in the set, the found patch with the tagged patch.

6. The method of claim 4, further comprising:
removing, from the set, one or more least effective patches for the subject identification according to their cumulative scores, wherein less effective patch for the subject identification is associated with a smaller cumulative score; and
inserting the tagged patch into the set, if the tagged patch is not linearly dependent with the patches in the set and if the number of patches in the set is not smaller than the defined maximum number of patches.

7. The method of claim 1, wherein updating statistics of the bases in the set comprises:
updating a cumulative score for each basis in the set based on the found sparse solution, wherein less effective basis for the subject identification is associated with a smaller cumulative score;
ranking the bases in the set by their cumulative scores, wherein a higher ranked basis in the set is more effective for the subject identification;
updating another cumulative score for each basis in the set based on a location of the basis in the signal subspace; and
adapting a probability density function (PDF) for spatial sampling of the filtered signal based on the updated other cumulative scores associated with all basis in the set.

8. The method of claim 1, wherein performing identification of the subject comprises:
reconstructing identity signals based on the sparse solution and the signal subspace; finding, based on the reconstructed identity signals, a minimum reconstruction error by using bases for the plurality of subjects; and
obtaining the identity of the subject of the plurality of subjects according to the found minimum reconstruction error.

9. The method of claim 1, wherein finding the sparse solution associated with the filtered signal comprises:
performing reconstruction of an image related to the filtered signal by using the signal subspace; and
obtaining the sparse solution by using the reconstructed image according to the $l_1$-norm minimization scheme.

10. The method of claim 9, wherein adaptively generating the signal subspace associated with the filtered signal comprises:
removing all empty rows from the signal subspace;
deleting each row from the signal subspace, if the row is under-represented in the signal subspace; and
preserving the row and removing all empty columns from the signal subspace, if the row is not under-represented in the signal subspace.

11. An apparatus for signal processing, comprising:
an interface for generating a signal related to a subject of a plurality of subjects; and
a recognition engine configured to filter the signal, adaptively generate a signal subspace according to the subject, find a sparse solution associated with the filtered signal by using the signal subspace, perform identification of the subject based on the sparse solution and the signal subspace if sparsity of the sparse solution is greater than a defined threshold value, update statistics of bases of the filtered signal in the set of bases, if identity of the subject is confirmed, and adaptively insert one or more new bases into the set of bases until the identity of the subject is confirmed, if the sparsity of the sparse solution is greater than the defined threshold value.

12. The apparatus of claim 11, wherein the signal corresponds to an image of a face of a person.

13. The apparatus of claim 11, wherein the recognition engine is further configured to:
find another sparse solution associated with another filtered signal, if the sparsity of the sparse solution is greater than the defined, threshold value and if identity of the subject is not confirmed.

14. The apparatus of claim 11, wherein the recognition engine is further configured to:
adaptively insert one or more new bases into the set of bases and find another sparse solution associated with the filtered signal, if the sparsity of the sparse solution is not greater than the defined threshold value.

15. The apparatus of claim 14, wherein the recognition engine is further configured to:
perform spatial sampling, of a training signal associated with the subject according to an adaptive probability density function (PDF) to generate one or more patches of the training signal;
tag the generated patches;
expand each of the tagged patches; and
insert each of the tagged patches into the set, if the tagged patch is not linearly dependent with patches from the set and if a number of the patches in the set is smaller than a defined maximum number of patches.

16. The apparatus of claim 15, wherein the recognition engine is further configured to:
find, in a portion of the set with linearly dependent bases according to their cumulative scores, a least effective patch for the subject identification, if the tagged patch is linearly dependent with the patches in the set; and
replace, in the set, the found patch with the tagged patch.

17. The apparatus of claim 15, wherein the recognition engine is further configured to:
remove, from the set, one or more least effective patches for the subject identification according to their cumulative scores, wherein less effective patch for the subject identification is associated with a smaller cumulative score; and
insert the tagged patch into the set, if the tagged patch is not linearly dependent with the patches in the set and if the number of patches in the set is not smaller than the defined maximum number of patches.

18. The apparatus of claim 11, wherein the recognition engine is configured to update statistics of the bases in the set by:
updating a cumulative score for each basis in the set based on the found sparse solution, wherein less effective basis for the subject identification is associated with a smaller cumulative score;
ranking the bases in the set by their cumulative scores, wherein a higher ranked basis in the set is more effective for the subject identification;

updating another cumulative score for each basis in the set based on a location of the basis in the signal subspace; and adapting a probability density function (PDF) for spatial sampling of the filtered, signal based on the updated other cumulative scores associated with all basis in the set.

19. The apparatus of claim 11, wherein the recognition engine is configured to perform identification of the subject by:

reconstructing identity signals based on the sparse solution and the signal subspace;

finding, based on the reconstructed identity signals, a minimum reconstruction error by using bases for the plurality of subjects; and obtaining the identity of the subject of the plurality of subjects according to the found minimum reconstruction error.

20. The apparatus of claim 11, wherein the recognition engine is further configured to find the sparse solution associated with the filtered signal by:

performing reconstruction of an image related to the filtered signal by using the signal subspace; and obtaining the sparse solution by using the reconstructed image according to the $l_1$-norm minimization scheme.

21. An apparatus for signal processing, comprising:

means for filtering a signal related to a subject of a plurality of subjects;

means for adaptively generating a signal subspace according to the subject;

means for finding a sparse solution associated with the filtered signal by using the signal subspace;

means for performing identification of the subject based on the sparse solution and the signal subspace, if sparsity of the sparse solution is greater than a defined threshold value;

means for updating statistics of bases of the filtered signal in a set of bases, if identity of the subject is confirmed; and means for adaptively inserting one or more new bases into the set of bases until the identity of the subject is confirmed, if the sparsity of the sparse solution is greater than the defined threshold value.

22. The apparatus of claim 21, further comprising:

means for finding another sparse solution associated with another filtered signal, if the sparsity of the sparse solution is greater than the defined threshold value and if identity of the subject is not confirmed.

23. The apparatus of claim 21, further comprising:

means for adaptively inserting one or more new bases into the set of bases and means for finding another sparse solution associated with the filtered signal, if the sparsity of the sparse solution is not greater than the defined threshold value.

24. The apparatus of claim 23, wherein the means for adaptively inserting the one or more new bases comprises:

means for performing spatial sampling of a training signal associated with the subject according to an adaptive probability density function (PDF) to generate one or more patches of the training signal;

means for tagging the generated patches;

means for expanding each of the tagged patches; and means for inserting each of the tagged patches into the set, if the tagged patch is not linearly dependent with patches from the set and if a number of the patches in the set is smaller than a defined maximum number of patches.

25. The apparatus of claim 24, further comprising:

means for finding, in a portion of the set with linearly dependent bases according to their cumulative scores, a least effective patch for the subject identification, if the tagged patch is linearly dependent with the patches in the set; and means for replacing, in the set, the found patch with the tagged patch.

26. The apparatus of claim 24, further comprising:

means for removing, from the set, one or more least effective patches for the subject identification according to their cumulative scores, wherein less effective patch for the subject identification is associated with a smaller cumulative score; and means for inserting the tagged patch into the set, if the tagged patch is not linearly dependent with the patches in the set and if the number of patches in the set is not smaller than the defined maximum number of patches.

27. The apparatus of claim 21, wherein the means for updating statistics of the bases in the set comprises:

means for updating a cumulative score for each basis in the set based on the found sparse solution, wherein less effective basis for the subject identification is associated with a smaller cumulative score;

means for ranking the bases in the set by their cumulative scores, wherein a higher ranked basis in the set is more effective for the subject identification;

means for updating another cumulative score for each basis in the set based on a location of the basis in the signal subspace; and means for adapting a probability density function (PDF) for spatial sampling of the filtered signal based on the updated other cumulative scores associated with all basis in the set.

28. The apparatus of claim 21, wherein the means for performing identification of the subject comprises;

means for reconstructing identity signals based on the sparse solution and the signal subspace;

means for finding, based on the reconstructed identity signals, a minimum reconstruction error by using bases for the plurality of subjects; and means for obtaining the identity of the subject of the plurality of subjects according to the found minimum reconstruction error.

29. The apparatus of claim 21, wherein the means for finding the sparse solution associated with the filtered signal comprises:

means for performing reconstruction of an image related to the filtered signal by using the signal subspace; and means for obtaining the sparse solution by using the reconstructed image according to the $l_1$-norm minimization scheme.

30. The apparatus of claim 29, wherein the means for adaptively generating the signal subspace associated with the filtered signal comprises:

means for removing all empty rows from the signal subspace;

means for deleting each row from the signal subspace, if the row is under-represented in the signal subspace; and means for preserving the row and removing all empty columns from the signal subspace, it the row is not under-represented in the signal subspace.

31. A computer-program product for signal processing, comprising a non transitory computer-readable medium having instructions stored thereon, the instructions being executable by one or more processors and the instructions comprising:

instructions for filtering a signal related to a subject of a plurality of subjects;

instructions for adaptively generating a signal subspace according to the subject;

instructions for finding a sparse solution associated with the filtered signal by using the signal subspace;

instructions for performing identification of the subject based on the sparse solution and the signal subspace, if sparsity of the sparse solution is greater than a defined threshold value;

instructions for updating statistics of bases of the filtered signal in a set of bases, if identity of the subject is confirmed; and instructions for adaptively inserting one or more new bases into the set of bases until the identity of the is confirmed, if the sparsity of the sparse solution is greater than the defined threshold value.

32. The computer-program product of claim 31, wherein the instructions further comprise:

instructions for finding another sparse solution associated with another filtered signal, if the sparsity of the sparse solution is greater than the defined threshold value and if identity of the subject is not confirmed.

33. The computer-program product of claim 31, wherein the instructions further comprise:

instructions for adaptively inserting one or more new bases into the set of bases and instructions for finding another sparse solution associated with the filtered signal, if the sparsity of the sparse solution is not greater than the defined threshold value.

34. The computer-program product of claim 33, wherein the instructions for adaptively inserting the one or more new bases comprise:

instructions for performing spatial sampling of a training signal associated with the subject according to an adaptive probability density function (PDF) to generate one or more patches of the training signal;

instructions for tagging the generated patches;

instructions for expanding each of the tagged patches; and instructions for inserting each of the tagged patches into the set, if the tagged patch is not linearly dependent with patches from the set and if a number of the patches in the set is smaller than a defined maximum number of patches.

35. The computer-program product of claim 34, wherein the instructions further comprise:

instructions for finding, in a portion of the set with linearly dependent bases according to their cumulative scores, a least effective patch for the subject identification, if the tagged patch is linearly dependent with the patches in the set; and instructions for replacing, in the set, the found patch with the tagged patch.

36. The computer-program product of claim 34, wherein the instructions further comprise:

instructions for removing, from the set, one or more least effective patches for the subject identification according to their cumulative scores, wherein less effective patch for the subject identification is associated with a smaller cumulative score; and instructions for inserting the tagged patch into the set, if the tagged patch is not linearly dependent with the patches in the set and if the number of patches in the set is not smaller than the defined maximum number of patches.

37. The computer-program product of claim 31, wherein the instructions for updating statistics of the bases in the set comprise:

instructions for updating a cumulative score for each basis in the set based on the found sparse solution, wherein less effective basis for the subject identification is associated with a smaller cumulative score;

instructions for ranking the bases in the set by their cumulative scores, wherein a higher ranked basis in the set is more effective for the subject identification;

instructions for updating another cumulative score for each basis in the set based on a location of the basis in the signal subspace; and instructions for adapting a probability density function (PDF) for spatial sampling of the filtered signal based on the updated other cumulative scores associated with all basis in the set.

38. The computer-program product of claim 31, wherein the instructions for performing identification of the subject comprise:

instructions for reconstructing identity signals based on the sparse solution and the signal subspace;

instructions for finding, based on the reconstructed identity signals, a minimum reconstruction error by using bases for the plurality of subjects; and instructions for obtaining the identity of the subject of the plurality of subjects according to the found minimum reconstruction error.

39. The computer-program product of claim 31, wherein the instructions for finding the sparse solution associated with the filtered signal comprise:

instructions for performing reconstruction of an image related to the filtered signal by using the signal subspace; and instructions for obtaining the sparse solution by using the reconstructed image according to the $l_1$-norm minimization scheme.

40. The computer-program product of claim 39, wherein the instructions for adaptively generating the signal subspace associated with the filtered signal comprise:

instructions for removing all empty rows from the signal subspace;

instructions for deleting each row from the signal subspace, if the row is under-represented in the signal subspace; and instructions for preserving the row and removing all empty columns from the signal subspace, if the row is not under-represented in the signal subspace.

* * * * *